United States Patent
Gudmunson

(10) Patent No.: US 7,405,770 B1
(45) Date of Patent: Jul. 29, 2008

(54) ADAPTIVE EQUALIZATION METHOD AND SYSTEM FOR REDUCING NOISE AND DISTORTION IN A SAMPLED VIDEO SIGNAL

(75) Inventor: Daniel Gudmunson, Dripping Springs, TX (US)

(73) Assignee: Cirrus Logic, Inc., Austin, TX (US)

( * ) Notice: Subject to any disclaimer, the term of this patent is extended or adjusted under 35 U.S.C. 154(b) by 637 days.

(21) Appl. No.: 11/116,098

(22) Filed: Apr. 27, 2005

Related U.S. Application Data

(60) Provisional application No. 60/618,265, filed on Oct. 13, 2004.

(51) Int. Cl.
*H04N 5/21* (2006.01)

(52) U.S. Cl. .................. 348/607; 348/610; 348/470; 348/701; 375/233; 382/275

(58) Field of Classification Search .......... 348/607, 348/606, 608, 610, 470, 701; 375/229, 232, 375/233, 235; 382/275; 708/323; 381/103; 333/28 R, 18
See application file for complete search history.

(56) References Cited

U.S. PATENT DOCUMENTS

| | | | |
|---|---|---|---|
| 4,652,922 A | 3/1987 | Ozaki | |
| 5,099,329 A | 3/1992 | Oyama et al. | |
| 5,113,142 A * | 5/1992 | Yoshikawa | 329/306 |
| 5,161,015 A | 11/1992 | Citta et al. | |
| 5,519,790 A | 5/1996 | Manning | |
| 6,546,149 B1 | 4/2003 | Ruggiero et al. | |
| 6,760,478 B1 | 7/2004 | Adiletta et al. | |
| 6,847,682 B2 | 1/2005 | Liang | |
| 6,912,322 B2 * | 6/2005 | Smith et al. | 382/275 |
| 6,975,777 B1 * | 12/2005 | Kenmochi | 382/268 |
| 7,260,377 B2 * | 8/2007 | Burns et al. | 455/341 |
| 2005/0201572 A1 * | 9/2005 | Lindahl et al. | 381/103 |

* cited by examiner

*Primary Examiner*—David Ometz
*Assistant Examiner*—Jean W Désir
(74) *Attorney, Agent, or Firm*—Andrew M. Harris; Mitch Harris, Atty at Law, LLC

(57) ABSTRACT

An adaptive equalization method and system for reducing noise and distortion in a sampled video signal improves the quality of output video information in both consumer and professional applications. A multi-band equalizer applied to the sampled video information reduces noise and distortion artifacts in the sampled video information. The gains of each of the equalizer bands is adjusted dynamically by control outputs provided by a noise and distortion detector. The noise and distortion detector incorporates circuits for comparing the luminance of each plane on a per-pixel basis with neighboring pixels and also includes a pattern matching comparator that detects edge features by comparing each pixel and its neighbors with a set of predetermined patterns. The noise and distortion detection can be further confirmed by comparing the detection results across multiple frames and the equalizer gain values may be further selected by a result of a video motion type classification.

12 Claims, 4 Drawing Sheets

ADAPTIVE EQUALIZATION METHOD AND SYSTEM FOR REDUCING NOISE AND DISTORTION IN A SAMPLED VIDEO SIGNAL

CROSS-REFERENCE TO RELATED APPLICATIONS

This application is related to U.S. provisional application Ser. No. 60/618,265, filed Oct. 13, 2004 by the same inventor and from which it claims benefits under 35 U.S.C. §119(e).

BACKGROUND OF THE INVENTION

1. Field of the Invention

The present invention relates generally to video processing systems, and more specifically, to a method and system that adaptively filter video data in response to detection of noise within the data.

2. Background of the Invention

Video processing systems are in common use for professional video production and are finding increasing use in consumer applications, such as personal computer video capture devices and video recorders such as digital versatile disc (DVD) recorders.

Analog video channels, and in particular analog video channels that originate from rendered compressed video data may not have a flat frequency response, as some frequencies may be attenuated due to the channel (e.g., video interconnect cables) or due to prior digital-domain compression algorithm that was applied to the source video (e.g., MPEG2 compression). Digital sources also have the same artifacts from compression, and particularly in the professional video production environment where compressed signals may be routed, decompressed and re-compressed many times, the compression artifacts lead to increased distortion. Further, deeper compression algorithms such as MPEG4 have an increased tendency toward introducing structured distortion.

Noise present in an analog video signal includes random noise and structured noise or distortion. Structured noise or distortion, such as the above-mentioned sources of channel and compression distortion could be removed or reduced through filtering or equalization, but as the video information is not known a priori and the channel and/or compression characteristics may dynamically change, determining the proper equalization to apply a priori does not yield the best results.

In addition to yielding a video image that is distorted or includes noise, presence of the above-described noise or distortion complicates the process of encoding video data. The noise or distortion may introduce components that are not actually part of the video image or may erroneously enhance portions of a video image that cause the re-encoding process to yield a larger data stream output than would be required to encode a noise-free and distortion-free version of the video data.

Techniques that have been applied to the pre-processing of video data for encoding include coring, in which a threshold is applied to video components to remove low-level components from the video signal prior to encoding. U.S. Pat. No. 5,161,015 describes a method for image classification with control of a pair of single-band peaking filters for the purposes of mitigating encoding distortion as an alternative improvement to coring. However, the technique described therein is applied to adaptive control of a single-band peaking filter for each direction (horizontal and vertical) that is generally useful for sharpening a video display that is transmitted through a broadcast radio-frequency channel and can introduce artifacts that it would be desirable to remove.

Therefore, it would be desirable to provide a method and system for adaptively filtering video data to reduce noise and distortion. It would further be desirable to provide such adaptive filtering in a method and system having low video processing overhead.

SUMMARY OF THE INVENTION

The above stated objectives of adaptively filtering video data to reduce noise and distortion with low processing overhead is achieved in an adaptive filtering method and system for processing video data.

The system includes a multi-band equalizer that receives the video data and filters the video data to yield output video data having reduced noise and distortion. The gain of each of the equalizer bands is adjusted in conformity with the output of a noise and distortion detector that receives the video data and determines on a per-pixel basis, a likely noise level of the video data.

The noise and distortion detector may employ a luminance detector that matches a neighborhood of pixels surrounding each measured pixel with the luminance of each pixel across each plane, and an edge detector comprising a pattern matching comparator that matches a set of known patterns against the matrix forming the neighborhood of the pixels. The edge detector may be informed by input from other stored fields or frames so that decisions about what is an actual edge versus a distortion or noise artifact can be made.

The equalizer coefficient set may also be further selected by a classifier that determines a type of video motion occurring across multiple fields and/or frames. The output of the noise and distortion detector is used to adjust the equalizer bands using a set of coefficients that are determined from a combination of any or all of the above noise detector criteria in order to reduce the amount of noise and distortion in the video signal.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses a method and system that adaptively equalize an input video signal or video data in order to reduce noise and distortion present in an output video signal or video data. The equalization is performed by a multi-band equalizer that has controllable gain coefficients. The levels of the gain coefficients are adjusted dynamically in response to the output of a noise and distortion detector that determines a likely level of noise and/or distortion the input video signal on a per-pixel basis. The determination can be made from detecting luminance changes for the pixel in each plane with respect to neighboring pixels and can be further qualified by an edge detecting pattern matcher that may operate across multiple frames and/or fields. Finally, the coefficient set can be further selected in conformity with the classification of the video signal as determined by motion detection across multiple frames and/or fields.

The pattern matching and classification information mentioned above can be extracted in conjunction with an encoding process that is being performed on the video information, such as MPEG-3 encoding for DVD recording. The algorithms and structures of the present invention can be performed by dedicated hardware or by program instructions for execution in a video processor or a general-purpose computing platform. The algorithms disclosed herein are intended for use in a real-time video processing environment, but can also be applied in systems such as personal desktop computers that process video data below the intended frame rate. U.S. Pat. No. 6,847,682 describes MPEG video classification types and algorithms and is incorporated herein by reference. U.S. Pat. No. 6,760,478 describes 2-pass motion MPEG encoding and is also incorporated herein by reference. Therefore, the details of motion detection and video classification will not be discussed in detail herein, but should be known to those of ordinary skill in the art, especially in conjunction with the above-incorporated patents.

Figure 1:
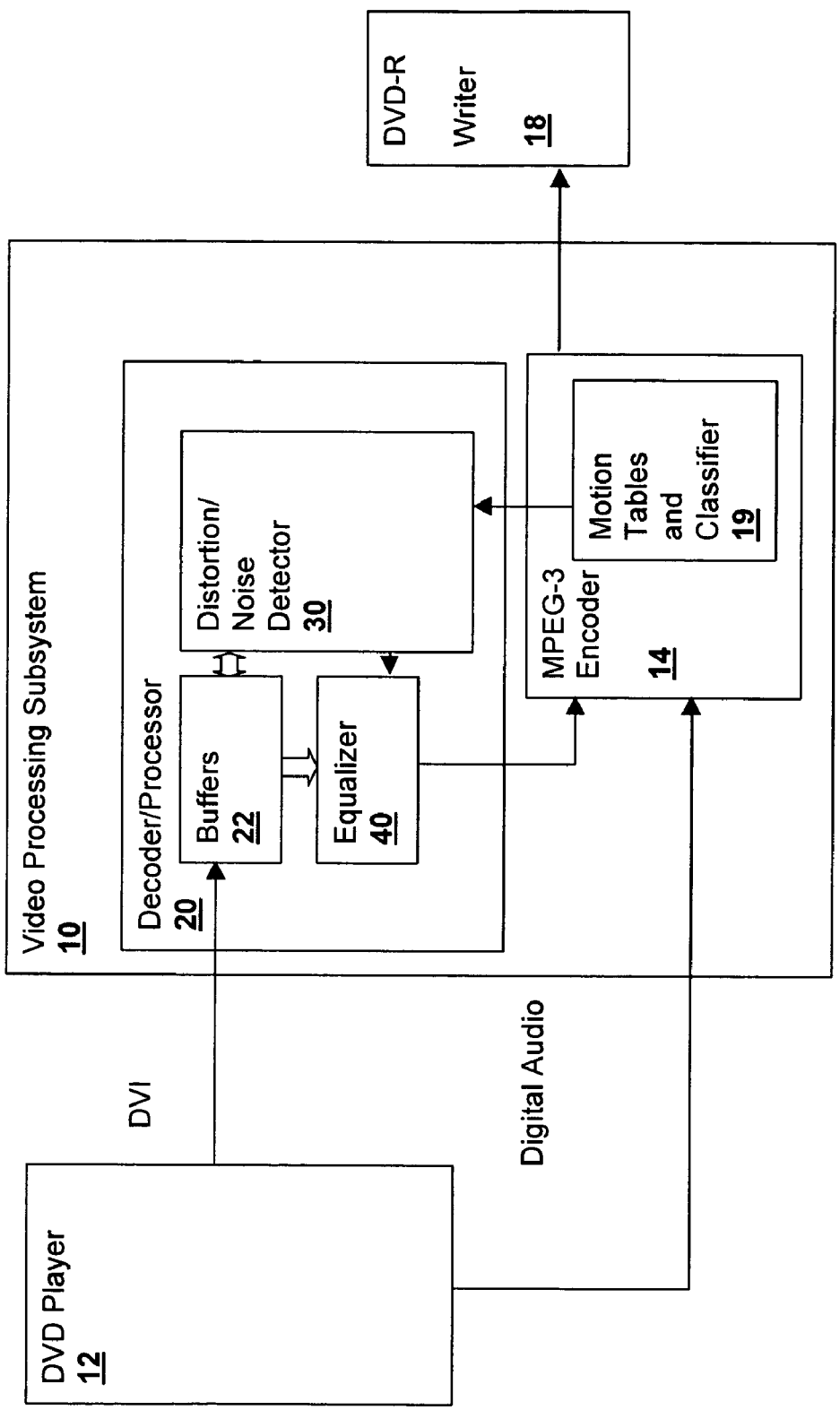
FIG. 1 is a block diagram depicting application of a video processing subsystem 10 in accordance with an embodiment of the present invention.

Referring now to FIG. 1, an application of a video processing subsystem 10 in accordance with an embodiment of the invention is illustrated. The depicted application is video capture of a digital versatile disc (DVD) player 12 output for storage on another digital versatile disc (DVD) via a DVD-R writer 16. Video processing subsystem 10 receives a digital video signal such as a digital visual interface (DVI) signal from DVD player 12 and generates compressed output video data for recording on a DVD located in DVD-R writer 18 via MPEG-3 Encoder 14. A decoder/processor 20 receives the DVI input and stores component video planes in buffers 22, which may be organized as YUV, RGB or any suitable separation color space. An equalizer 40 processes the decoded and stored video data according to a set of dynamic gain coefficients determined by a distortion/noise detector 30, removing noise and distortion artifacts that would otherwise increase the data size of the encoded output video data produced by MPEG-3 encoder 14 and lead to further distortion in the encoding process. By further realizing the effect of a particular encoding process on video data, the data can be adaptively pre-equalized to reduce the distortion effects of the encoding process. The encoder shown as MPEG-3 encoder is exemplary only and the techniques of the present invention applied to other encoding schemes as well including MPEG-2 and MPEG-4.

Distortion/noise detector can be further informed by feedback from the encoding process of MPEG-3 encoder 14. A set of motion tables and a classifier 19 that are used to encode the incoming video data provide information about video type classification such as "sports" or "organic", that can be used to select a set of coefficients or adjust coefficients provided to equalizer 40. Also, distortion/noise detector can be informed by information available over several fields or frames, such as edge position motion information available from motion tables and classifier 19. Thus, the noise and distortion detection of the present invention can be closely linked to an encoder or encoding processor algorithm, or may be implemented separately when no direct encoding is present in the particular unit in which the present invention is implemented.

It should also be understood that the disclosed embodiment of the present invention is shown in a block diagram form for illustrative purposes and that the disclosed structure does not limit the possible organization and location of the components. In particular, a software-based implementation can and will take advantage of mathematical and processing improvements possible by merging functionality of the depicted blocks. For example, the entire process of noise/distortion detection may be embedded within an encoder algorithm as mentioned above, as many common processing functions and/or accesses to buffer data may be present.

Figure 2:
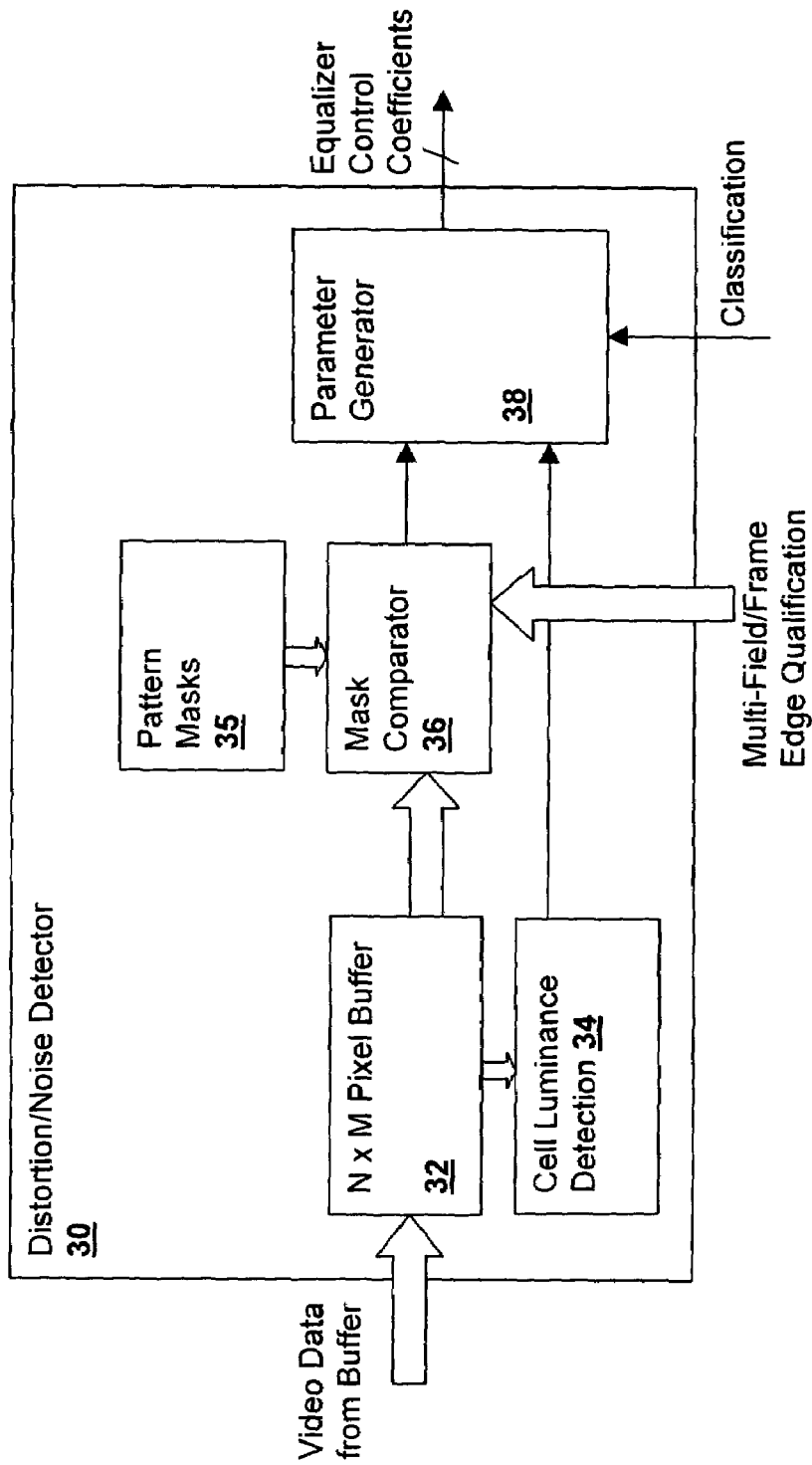
FIG. 2 is a block diagram depicting details of noise and distortion detector 30 of system 10.

Referring now to FIG. 2, details of distortion/noise detector 30 are depicted in accordance with an embodiment of the present invention. A pixel buffer 32 including storage for N horizontal by M vertical pixels is received from buffers 22 and may be reproduced for each color plane or re-used sequentially. A mask comparator 36 matches the pixel buffer 32 against a known set of bit pattern masks 35 and generates an output to a parameter generator 38 that provides equalizer control coefficients for controlling a gain of each band of equalizer 40. A cell luminance detector computes an average luminance value for pixels surrounding the pixel referenced to the current instant in time and compares the computer average to the actual luminance value of the pixel to provide a further input to parameter generator 38. The neighborhood of pixels used for the luminance computation may be just the 8 neighbor pixels from the 3×3 matrix surrounding the current pixel, may be the entire N×M array of pixel buffer 32, or another neighborhood defined for the purposes of improving filtering performance.

Parameter generator 31 algorithmically combines the luminance detection results, the pixel mask comparison results and classification information (including multi-frame edge motion information) to produce the equalizer control coefficients. For example, the luminance detection may qualify whether to use a nominal equalization for the pixel, depending on the current pixel luminance not differing from the average by more than a threshold. The pattern comparison result may determine that the pixel is part of an edge, and therefore should not be equalized toward the pixel average, further qualifying the luminance detection result. Multi-field/frame edge qualification information can further inform the pattern comparison result by determining if a luminance change is due to motion of an edge detected over several fields or frames. The resulting multi-frame detection can be used to improve a level of confidence of a decision between a change in one or pixels being due to the pixel's position at an authentic edge, or being due to a distortion artifact or noise. Finally, classification information can be used by parameter generator 38 to select from a set of coefficients for each video type where the coefficients within the selected set were determined from the other inputs (pattern match and luminance detection results).

Figure 3:
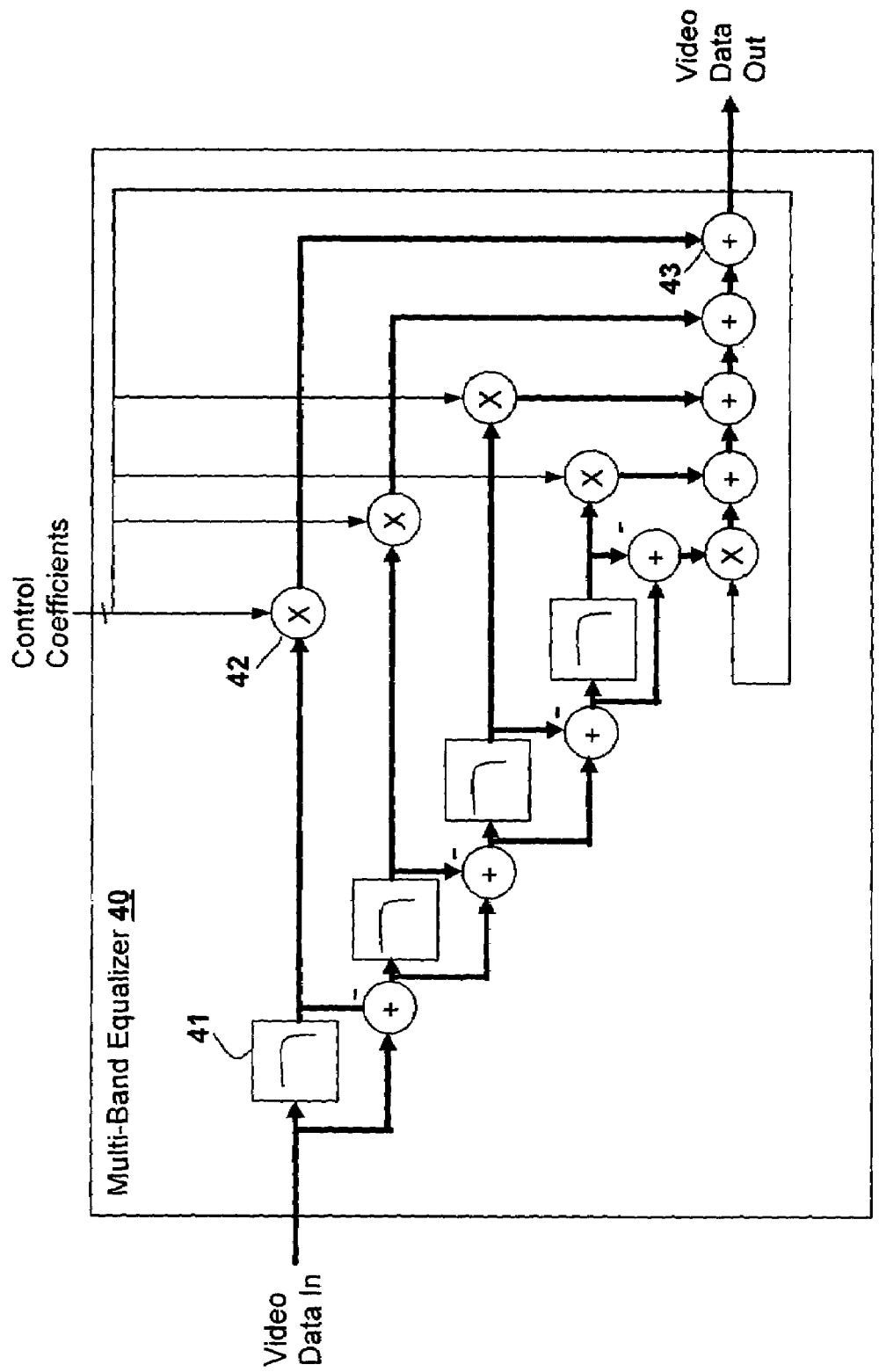
FIG. 3 is a block diagram showing details of equalizer 40 of FIG. 1.

Referring now to FIG. 3, details of multi-band equalizer 40 are shown in accordance with an embodiment of the present invention. A set of low pass filters 41 are arranged in a subtractive cascade to provide bandpass outputs that are gain controlled by multipliers 42 and summed by adders 43 to provide the output video data. While control coefficients are or can be determined on a per-pixel basis, the actual response of the filtering algorithm is a function of the response of low pass filters and any smoothing applied to the coefficients by parameter generator 38. The frequency bands corresponding to low pass filters 41 are not related to color as in a chrominance representation, but the bands apply to luminance change bandwidths of individual color planes, and therefore to a rate of change of luminance of a particular color component within an area of a video field or frame. Therefore, an equalizer 40 is generally supplied for each plane so that low pass filters 41 have a response history over only the corresponding color planes.

Figure 4:
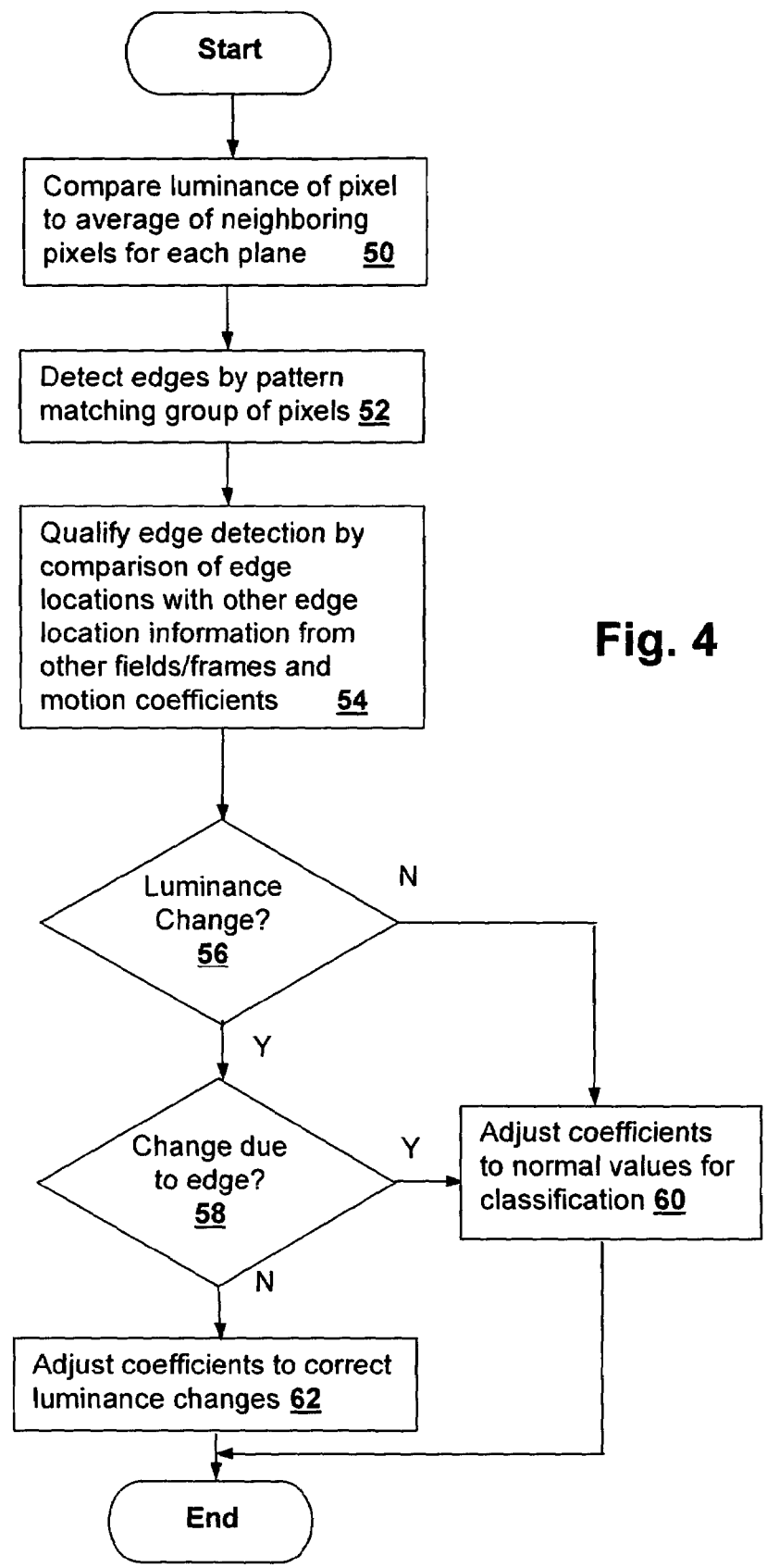
FIG. 4 is a flowchart illustrating a method in accordance with an embodiment of the present invention.

Referring now to FIG. 4, a method in accordance with an embodiment of the present invention is illustrated in a flowchart. The flowchart illustrates a process that is repeated for each pixel over each color plane. The luminance of each pixel is compared to an average luminance value for the neighboring pixels (step 50). Also, edges are detected by pattern matching groups of pixels moving through pixel buffer (step 52). The edge detection is qualified by comparison of edge locations from other fields/frames and motion coefficient information in motion tables (step 54). If the luminance of the pixel matches the neighboring average (decision 56) then coefficients are set to normal values for the particular overall video classification for the local region or field/frame (step 60). Also, if the change is determined to be due to an edge (decision 58), then the normal values are also applied (step 60). However, if a luminance change was detected (decision 56) and determined to not be due to an edge (decision 58), then the coefficients of the equalizer are adjusted to correct the luminance change (step 62).

The above-described algorithm is a simplified algorithm used to show the various factors that may be employed to determine the equalizer gain control coefficients and the general direction that the equalizer gain coefficients are moved in order to remove noise or distortion. Thus, the illustrated method is not intended to be limiting or exhaustive as to the possible computations that may be employed to determine the equalizer gain coefficients and the above-illustrated algorithm should also be understood to apply to computations of algorithms having predictive ability as to distortion that may be introduced by a downstream encoding process. For example, it may be known that a particular encoding process introduces a delay between the center of an edge and an input luminance change peak, and therefore a corresponding delay may be introduced between the pattern match location and luminance change location decisions expressed in decisions 56 and 58 in order to pre-compensate the video data prior to encoding.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for improving the quality of video information, comprising;
   equalizing said video information with a multi-band equalizer having adjustable gain coefficients for each band;
   detecting a likely noise and distortion level of said video information on a per-pixel basis;
   classifying a type of video motion in said video information over multiple frames; and
   selecting a set of said gain coefficients in conformity with a result of said detecting and further in conformity with a result of said classifying, wherein said gain coefficients of said equalizer are adjusted in conformity with a result of said detecting to reduce said noise and distortion level.

2. The method of claim 1, wherein said detecting is performed by comparing a value of each pixel to a value computed from pixels neighboring said each pixel.

3. The method of claim 2, wherein said detecting is further performed by matching a pattern of pixels including said each pixel and pixels neighboring said each pixel with a set of predetermined patterns.

4. The method of claim 3, wherein said detecting further comprises comparing a result of said matching with a result of a detection performed on one or more other frames, whereby a level of confidence of said detecting is improved.

5. The method of claim 1, wherein said detecting is performed by matching a value of each pixel and pixels neighboring said each pixel with a set of predetermined patterns.

6. The method of claim 5, wherein said detecting further comprises comparing a result of said matching with a result of a detection performed on one or more other frames, whereby a confidence level of said detecting is improved.

7. A system for improving the quality of video information, comprising:
   a multi-band equalizer having an input for receiving said video information and an output for providing output video information, said multi-band equalizer having a plurality of control inputs each for adjusting the gain of an associated band of said multi-band equalizer;
   a noise and distortion detector having an input for receiving said video information and outputs coupled to said control inputs of said multi-band equalizer;
   a video classifier for classifying a type of video motion in said video information over multiple frames; and
   a selector for selecting a set of values for said control inputs in conformity with said outputs of said noise and distortion detector and further in conformity with an output of said video classifier.

8. The system of claim 7, wherein said noise and distortion detector compares a value of each pixel to a value computed from pixels neighboring said each pixel.

9. The system of claim 8, wherein said noise and distortion detector further matches a pattern of pixels including said each pixel and pixels neighboring said each pixel with a set of predetermined patterns.

10. The system of claim 9, wherein said noise and distortion detector further compares a result of said matching with a result of a detection performed on one or more other frames, whereby a confidence level of said detecting is improved.

11. The system of claim 7, wherein said noise and distortion detector matches a pattern of pixels including said each pixel and pixels neighboring said each pixel with a set of predetermined patterns.

12. The system of claim 11, wherein said noise and distortion detector further compares a result of said matching with a result of a detection performed on one or more other frames, whereby a confidence level of said detecting is improved.

* * * * *